(12) United States Patent
Zheng et al.

(10) Patent No.: US 11,349,151 B2
(45) Date of Patent: May 31, 2022

(54) ALL-SOLID-STATE LITHIUM BATTERY AND PREPARATION METHOD THEREOF

(71) Applicant: UNIVERSITY OF SHANGHAI FOR SCIENCE AND TECHNOLOGY, Shanghai (CN)

(72) Inventors: Shiyou Zheng, Shanghai (CN); Yuepeng Pang, Shanghai (CN); Xinxin Shi, Shanghai (CN); Xitong Wang, Shanghai (CN); Yufang Wang, Shanghai (CN); Zhengfang Nie, Shanghai (CN)

(73) Assignee: UNIVERSITY OF SHANGHAI FOR SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 16/964,206

(22) PCT Filed: Mar. 13, 2020

(86) PCT No.: PCT/CN2020/079132
§ 371 (c)(1),
(2) Date: Jul. 23, 2020

(87) PCT Pub. No.: WO2020/215921
PCT Pub. Date: Oct. 29, 2020

(65) Prior Publication Data
US 2021/0234192 A1    Jul. 29, 2021

(30) Foreign Application Priority Data
Apr. 24, 2019   (CN) .......................... 201910332905.1

(51) Int. Cl.
*H01M 10/0562* (2010.01)
*H01M 10/0525* (2010.01)
*H01M 10/0585* (2010.01)

(52) U.S. Cl.
CPC ... *H01M 10/0562* (2013.01); *H01M 10/0525* (2013.01); *H01M 10/0585* (2013.01); *H01M 2300/0068* (2013.01)

(58) Field of Classification Search
CPC ..... H01M 10/0525; H01M 2300/0068; H01M 10/058; H01M 10/0562; H01M 10/0585; Y02P 70/50; Y02E 60/10
(Continued)

(56) References Cited

U.S. PATENT DOCUMENTS

2016/0204466 A1* 7/2016 Nogami .............. H01M 4/5815
429/322

FOREIGN PATENT DOCUMENTS

CN    207967198 U    10/2018
CN    109411695 A    3/2019
(Continued)

OTHER PUBLICATIONS

International Search Report in PCT/CN2020/079132, issued by ISA, dated May 27, 2020.
(Continued)

*Primary Examiner* — Gary D Harris
(74) *Attorney, Agent, or Firm* — Zhu Lehnhoff LLP

(57) ABSTRACT

The present invention discloses a preparation method of an all-solid-state lithium battery based on borohydride/sulfide two-layer fast ion conductors, comprising the steps of: Step 1: cold-pressing a borohydride fast ion conductor and a sulfide fast ion conductor into a two-layer electrolyte; Step 2: mixing a cathode active material, a sulfide fast ion conductor, and a conductive agent according to a ratio to prepare a cathode of the all-solid-state lithium battery, and cold-pressing the cathode onto a side, corresponding to the sulfide fast ion conductor, of the two-layer electrolyte obtained in Step 1; and taking a lithium metal plate as an
(Continued)

anode of the all-solid-state lithium battery, and cold-pressing the anode onto a side, corresponding to the borohydride fast ion conductor, of the two-layer electrolyte obtained in Step 1; and Step 3: packaging a material obtained in Step 2 to obtain the all-solid-state lithium battery based on borohydride/sulfide two-layer fast ion conductors. According to the present invention, an all-solid-state battery with high working voltage and good cycle performance is achieved, and the preparation process is simple and has good repeatability, thereby being suitable for large-scale commercial production.

4 Claims, 2 Drawing Sheets

(58) Field of Classification Search
USPC .......................................................... 429/188
See application file for complete search history.

(56) References Cited

FOREIGN PATENT DOCUMENTS

| CN | 110061285 A | 7/2019 |
|---|---|---|
| JP | 2018116784 A | 7/2018 |
| KR | 20180051717 A | 5/2018 |

OTHER PUBLICATIONS

Written Opinion of the International Search Report in PCT/CN2020/079132, issued by ISA, dated May 27, 2020.

\* cited by examiner

ALL-SOLID-STATE LITHIUM BATTERY AND PREPARATION METHOD THEREOF

TECHNICAL FIELD

The present invention belongs to the field of new energy materials, and particularly relates to an all-solid-state lithium battery based on borohydride/sulfide two-layer fast ion conductors and a preparation method thereof.

BACKGROUND

As an energy conversion device, batteries are widely used in people's daily lives, however, currently commercially available batteries (such as lead-acid batteries, nickel-metal hydride batteries, lithium ion batteries and flow batteries) cannot meet people's increasing demands on portable electronic devices, electric vehicles and large-scale energy storage systems. In the past, most researches on batteries have focused on the organic liquid electrolyte system, which is less chemically stable and less electrochemically stable with a low degree of ion selectivity, and is prone to electrolyte heating in anomalies such as overcharge and internal short-circuiting, posing a risk of spontaneous combustion and even explosion. Lithium metal is considered to be the optimal anode material to prepare high energy density batteries because of its low electrochemical potential, low density and high theoretical capacity. However, lithium metal is extremely reactive and it is easy to form uncontrolled dendritic lithium at the interface of lithium anode, which may puncture the separator during cycles, thus leading to internal short-circuiting and serious safety problems. Therefore, using inorganic solid electrolytes with high mechanical strength to prepare all-solid-state lithium batteries will not only solve the safety problems of the organic liquid electrolyte, but also suppress the dendritic lithium growth, thereby achieving high energy density and providing possibility for developing a novel battery.

As a key component of the all-solid-state battery system, solid electrolytes have been widely concerned by researchers at home and abroad. They are generally classified into inorganic solid electrolytes, polymer solid electrolytes, and composite solid electrolytes according to their chemical compositions. Among them, inorganic solid electrolytes, represented by lithium lanthanum zirconium oxide and lithium germanium phosphorus sulfide, are greatly improved in ionic conductivity which is up to $10^{-3}$ to $10^{-2}$ S cm$^{-1}$ at room temperature [Adv. Mat., 2018, 30(17):e1705702.], where the value is close to or even exceeding the level of liquid electrolytes and can substantially meet the requirements on electrolyte conductivity in commercial batteries. However, in the development of practical all-solid-state batteries, it is recognized that the problem of the interfaces between the solid electrolyte and the cathode and anode materials may seriously affect the overall performance of all-solid-state batteries. The stability of sulfide solid electrolyte and electrode materials has been studied extensively, for example, during long cycles, the impedance at the cathode/sulfide solid electrolyte interface increases, resulting in degradation of battery capacity [ACS. Appl. Mater. Interfaces, 2018, 10(26): 22226-22236]. If a buffer layer is introduced at the cathode/sulfide solid electrolyte interface, the space charge layer and element interdiffusion can be suppressed so as to reduce the interfacial impedance [Chem. Mater., 2010, 22(3): 946-956]. Both theoretical calculation and experimental results show that sulfide solid electrolytes are unstable to lithium metal and will be reduced by lithium to form an interface layer after contacting with lithium. The interface layer generally comprises $Li_2S$ and $Li_3P$ and other components, and has a low lithium ion conductivity and a high electron conductivity, and continuous interfacial reactions also lead to interface degradation and thus reduction in coulombic efficiency of the batteries [Chem. Mater., 2016, 28(1): 949-956]. Therefore, all-solid-state batteries assembled using sulfide as the electrolyte mainly employ Li—In alloy as the anode, which has a potential of about 0.6 V vs. Li/Li$^+$, so that the working voltage of the battery is lowered, thereby significantly reducing the energy density of the batteries. Similarly, the cathode/garnet-type solid electrolyte interface also has the problems such as element interdiffusion, volume expansion, and increase of interface impedance. [J. Power Sources, 2014, 260: 292-298] Garnet-type lithium lanthanum zirconium oxide solid electrolyte has a low reduction potential (about 0.5V) for lithium, however, direct adhesion of lithium metal to the electrolyte results in a poor physical contact and a very high interfacial impedance. Such electrolyte is less elastically deformable, the ceramic plate is easy to crack, and the existence of a large amount of grain boundaries makes the garnet-type solid ceramic electrolyte incapable of completely preventing the growth of lithium dendrites. Therefore, in order to achieve high energy density and long cycle stability of all-solid-state batteries, the problem of the interfaces between solid electrolyte and cathode and anode materials is very important.

Among various solid electrolyte materials reported so far, borohydride, as a new type of solid electrolyte material, is stable to lithium due to its strong reducibility, and has a low grain boundary impedance and a high mechanical deformability. Matsuo et. al. from Tohoku University reported for the first time that lithium borohydride would transit from the orthorhombic phase, with a low Li$^+$ conductivity at room temperature ($10^{-8}$ S cm$^{-1}$, 30° C.), to hexagonal ($10^{-3}$ S cm$^{-1}$, 120° C.) at about 110° C. Maekawa et. al. then found that the high temperature phase of lithium borohydride could be stabilized at room temperature with addition of lithium halide, and pointed out that the lithium metal/lithium borohydride interface would remain stable at a high current density above 40 mAcm$^{-2}$ [J. Am. Chem. Soc., 2009, 131: 894.]. Since then, active substances such as lithium titanate, titanium disulfide and sulfur begun to be used in lithium metal-lithium borohydride systems, and assembled all-solid-state batteries are endowed with high capacity and excellent cycle stability. However, they are all low-voltage electrode materials, and the assembled batteries only have a voltage of about 2 V even when they were matched with lithium metal. Takahashi et al. found that lithium borohydride would react with lithium cobaltate in a charging state to produce $LiBO_2$, $Li_2O$, $Co_3O_4$ and $CoO(OH)$, resulting in increase in interface impedance and thus battery failure. They used pulsed laser deposition to coat the surface of lithium cobaltate with a layer of 25 nm thick lithium phosphate, which can effectively inhibit the interfacial reactions [J. Power Sources, 2013, 226:41-61.]. The group continued to study the inhibition of interfacial reactions by pulsed laser deposition of lithium phosphate, lithium niobate and aluminum oxide in different thicknesses on the surface of lithium cobaltate, and the results showed that the thickness of lithium phosphate should be kept at 10-25 nm and the thickness of aluminum oxide should be less than 1 nm, because the ionic conductivities of these coating materials are very low. Lithium niobate also could not achieve a good inhibitory effect, it would be consumed firstly by reacting with lithium borohydride, and then lithium borohydride would react with lithium cobaltate [Solid State Ionics, 2014, 262:179-182].

SUMMARY OF THE INVENTION

A technical problem to be solved by the present invention is that a solid electrolyte cannot be well compatible with a lithium metal anode and a high-voltage cathode at the same time, which causes the lithium dendrite problem and the interface impedance problem of all-solid-state batteries and significantly affects the large-scale commercial application of all-solid-state batteries.

In order to solve the above technical problem, the present invention provides an all-solid-state lithium battery based on borohydride/sulfide two-layer fast ion conductors, comprising a two-layer electrolyte composed of a layer of borohydride fast ion conductor and a layer of sulfide fast ion conductor, a cathode of the battery, and an anode of the battery; the cathode of the battery being positioned at a side corresponding to the layer of sulfide fast ion conductor, and the anode of the battery being positioned at a side corresponding to the layer of borohydride fast ion conductor.

Preferably, the cathode of the battery is prepared by mixing a cathode active material, a sulfide fast ion conductor, and a conductive agent according to a ratio; and the anode of the battery is a lithium metal plate.

More preferably, the borohydride fast ion conductor is any one of lithium borohydride, lithium borohydride-lithium iodide and closed lithium-boron-hydrogen composite fast ion conductors; and the sulfide fast ion conductors are any one of lithium sulfide-phosphorus pentasulfide and lithium germanium phosphorus sulfide fast ion conductors.

The present invention further provides a preparation method of an all-solid-state lithium battery based on borohydride/sulfide two-layer fast ion conductors, comprising the steps of:

Step 1: cold-pressing a borohydride fast ion conductor and a sulfide fast ion conductor into a two-layer electrolyte;

Step 2: mixing a cathode active material, a sulfide fast ion conductor, and a conductive agent according to a ratio to prepare a cathode of the all-solid-state lithium battery, and cold-pressing the cathode onto a side, corresponding to the sulfide fast ion conductor, of the two-layer electrolyte obtained in Step 1; and taking a lithium metal plate as an anode of the all-solid-state lithium battery, and cold-pressing the anode onto a side, corresponding to the borohydride fast ion conductor, of the two-layer electrolyte obtained in Step 1; and Step 3: packaging a material obtained in Step 2 to obtain the all-solid-state lithium battery based on borohydride/sulfide two-layer fast ion conductors.

Preferably, the borohydride fast ion conductor in Step 1 is any one of lithium borohydride, lithium borohydride-lithium iodide and closed lithium-boron-hydrogen composite fast ion conductors.

Preferably, the sulfide fast ion conductors in Step 1 and Step 2 are any one of lithium sulfide-phosphorus pentasulfide and lithium germanium phosphorus sulfide fast ion conductors.

Preferably, the cold-pressing in Step 1 and Step 2 is carried out in a pressing mode of equiaxed pressing with a pressure of 100 to 500 MPa and a pressure-holding time of 5 to 20 min.

Preferably, the two-layer electrolyte in Step 1 is plate-shaped with a total thickness of 0.1 to 5 mm, with the borohydride fast ion conductor layer having a thickness of 10-90% of the total thickness and the sulfide fast ion conductor layer having a thickness of 10-90% of the total thickness.

Preferably, the cathode active material in Step 2 is any one of lithium iron phosphate, lithium cobaltate, lithium nickel manganese oxide and lithium nickel manganese cobalt oxide.

Preferably, the conductive agent in Step 2 is any one of carbon, copper and a conducting polymer.

Preferably, the packaging in Step 3 is any one of button cell packaging, pouch cell packaging and solid-state battery mould packaging.

Compared with the prior art, the present invention has the following beneficial effects that:

(1) according to the invention, the stability of the borohydride fast ion conductor to the lithium metal anode and the stability of the sulfide fast ion conductor to the high-voltage cathode are fully combined, so that the cathode and anode compatibility problem of the solid electrolyte is solved, and an all-solid-state battery with high working voltage and good cycle performance is achieved; and (2) the preparation method described herein is simple and has good repeatability, thereby being suitable for large-scale commercial production.

DETAILED DESCRIPTION OF THE PREFERRED EMBODIMENTS

The invention will be further illustrated below with reference to specific examples. It will be understood that these examples are merely illustrative of the invention and are not intended to limit the scope of the invention. In addition, it will be understood that various changes and modifications may be made by those skilled in the art in light of the teachings of this invention, and equivalents also fall within the scope of the appended claims of the invention.

EXAMPLE 1

This example provides a preparation method of an all-solid-state lithium battery based on borohydride/sulfide two-layer fast ion conductors, which specifically comprises the following steps:

Step 1: 50 mg of $LiBH_4$—$LiI$ and 50 mg of $Li_{10}GeP_2S_{12}$ were cold-pressed into a two-layer electrolyte under 100 MPa with the pressure held for 5 min, the total thickness being 1.2 mm, and the thickness of each layer being 0.6 mm;

Step 2: 5 mg of a lithium cobaltate cathode (prepared by mixing and grinding 60 wt % of $LiCoO_2$, 30 wt % of $Li_{10}GeP_2S_{12}$ and 10 wt % of Ketjen black) was cold-pressed onto a side, corresponding to $Li_{10}GeP_2S_{12}$, of the two-layer electrolyte obtained in Step 1; a lithium metal plate (99.9%, China Energy Lithium Co., Ltd.) was taken as an anode of the all-solid-state lithium battery, and the anode was cold-pressed onto a side, corresponding to $LiBH_4$—LiI, of the two-layer electrolyte obtained in Step 1, wherein the cold-pressing was carried out under a pressure of 100 Mpa with the pressure held for 5 min; and Step 3: a material obtained in Step 2 was packaged into a 2025 button cell battery to obtain the all-solid-state lithium battery based on borohydride/sulfide two-layer fast ion conductors.

Figure 1:
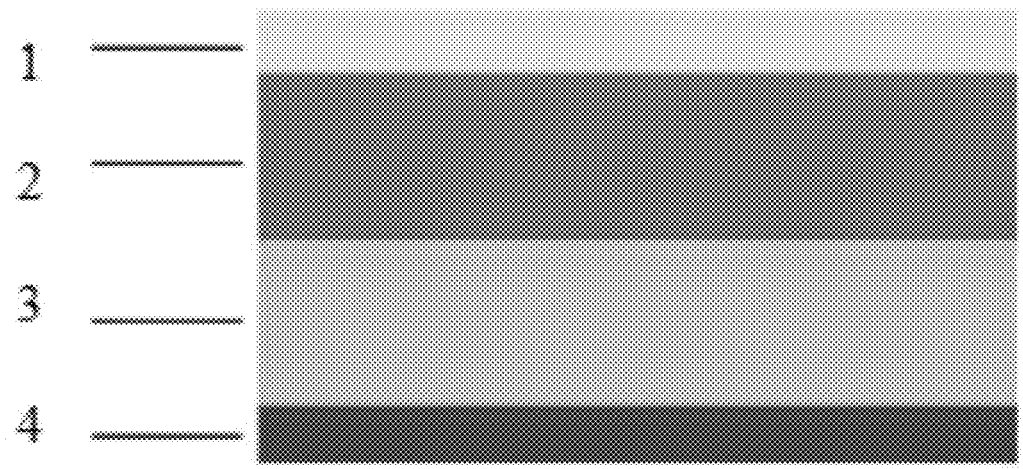
FIG. 1 is a schematic view showing the structure of an all-solid-state lithium battery based on borohydride/sulfide two-layer fast ion conductors; wherein 1 is an anode, 2 is a borohydride fast ion conductor, 3 is a sulfide fast ion conductor, and 4 is a cathode.
Figure 2:
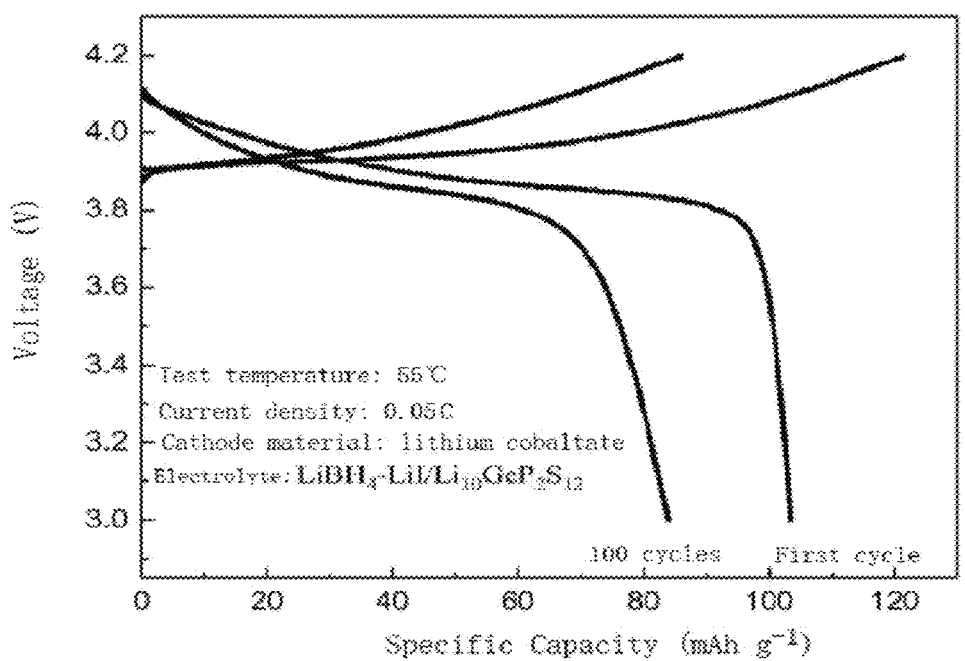
FIG. 2 is a charge-discharge curve of an all-solid-state lithium battery employing lithium cobaltate as a cathode, $LiBH_4$—$LiI$/$Li_{10}GeP_2S_{12}$ as an electrolyte and lithium metal as an anode according to Example 1.

The prepared all-solid-state lithium battery was charged and discharged with a constant current of 0.05 C under 55° C., and test results are shown in FIG. 2: from the constant current charge-discharge curve in FIG. 2, it can be seen that the battery had a specific discharge capacity at the first cycle of 105 mAh $g^{-1}$, and retained a specific discharge capacity of 90 mAh $g^{-1}$ (85.7% of the initial discharge specific capacity) after 100 cycles, with a charge plateau of up 3.9 V and a discharge plateau of about 3.85 V. The results show that the all-solid-state lithium battery employing $LiBH_4$—$LiI/Li_{10}GeP_2S_{12}$ as the electrolyte can achieve a long cycle life and a high capacity retention rate.

EXAMPLE 2

This example provides a preparation method of an all-solid-state lithium battery based on borohydride/sulfide two-layer fast ion conductors, which specifically comprises the following steps:

Step 1: 60 mg of $LiBH_4$—LiI and 40 mg of $70Li_2S$-$30P_2S_5$ were cold-pressed into a two-layer electrolyte under 200 MPa with the pressure held for 20 min, the total thickness being 1.0 mm, the thickness of the $LiBH_4$—LiI being 0.6 mm, and the thickness of the $70Li_2S$-$30P_2S_5$ layer being 0.4 mm;

Step 2: 5 mg of a lithium iron phosphate cathode (prepared by mixing and grinding 50 wt % of $LiFePO_4$, 40 wt % of $70Li_2S$-$30P_2S_5$ and 10 wt % of Ketjen black) was cold-pressed onto a side, corresponding to $70Li_2S$-$30P_2S_5$, of the two-layer electrolyte obtained in Step 1; a lithium metal plate (99.9%, China Energy Lithium Co., Ltd.) was taken as an anode of the all-solid-state lithium battery, and the anode was cold-pressed onto a side, corresponding to $LiBH_4$—LiI, of the two-layer electrolyte obtained in Step 1, wherein the cold-pressing was carried out under a pressure of 200 Mpa with the pressure held for 20 min; and Step 3: a material obtained in Step 2 was packaged into a 2032 button cell battery to obtain the all-solid-state lithium battery based on borohydride/sulfide two-layer fast ion conductors.

Figure 3:
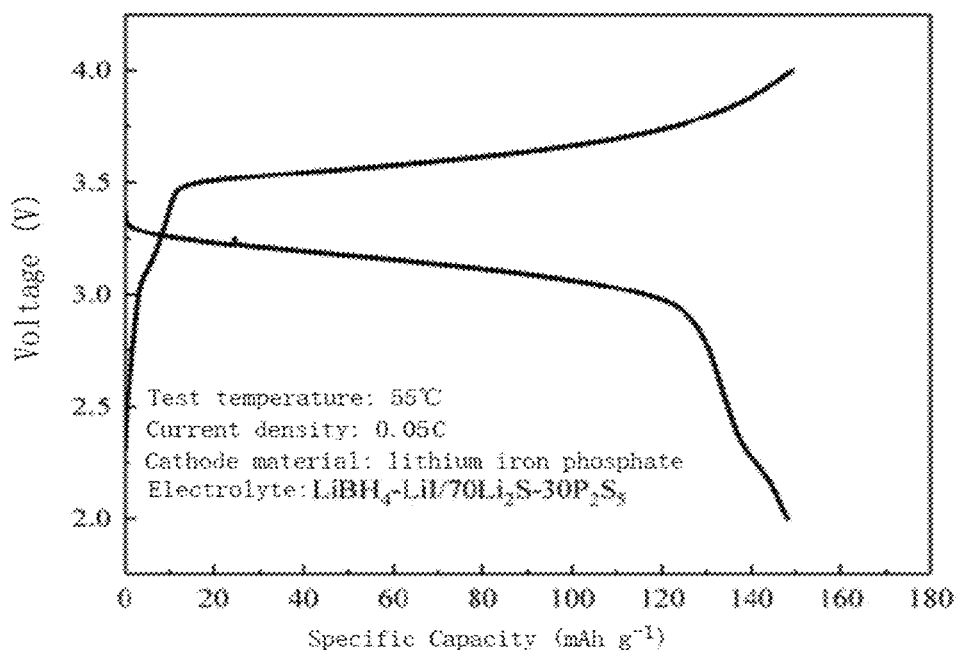
FIG. 3 is a charge-discharge curve of an all-solid-state lithium battery employing lithium iron phosphate as a cathode, $LiBH_4$—$LiI$/$70Li_2S$-$30P_2S_5$ as an electrolyte and lithium metal as an anode according to Example 2.

The prepared all-solid-state lithium battery was charged and discharged with a constant current of 0.05 C under 55° C., and test results are shown in FIG. 3: from the constant current charge-discharge curve in FIG. 3, it can be seen that the battery had a specific discharge capacity at the first cycle of 150 mAh which is 88% of the theoretical capacity. The output voltage was about 3.2 V, which is slightly lower than 3.4 V of the liquid electrolyte system. The results show that the borohydride/sulfide two-layer fast ionic conductor electrolyte is also suitable for the lithium iron phosphate cathode, and its specific discharge capacity is close to that of the liquid electrolyte system.

EXAMPLE 3

This example provides a preparation method of an all-solid-state lithium battery based on borohydride/sulfide two-layer fast ion conductors, which specifically comprises the following steps:

Step 1: 40 mg of $Li_2B_{12}H_{12}$ and 60 mg of $Li_{3.25}Ge_{0.25}P_{0.75}S_4$ were cold-pressed into a two-layer electrolyte under 300 MPa with the pressure held for 100 min, the total thickness being 1.0 mm, the thickness of the $Li_2B_{12}H_{12}$ layer being 0.4 mm, and the thickness of the $Li_{3.25}Ge_{0.25}P_{0.75}S_4$ layer being 0.6 mm;

Step 2: 10 mg of a lithium nickel manganese oxide cathode (prepared by mixing and grinding 60 wt % of $LiNi_{0.5}Mn_{1.5}O_4$, 30 wt % of $60Li_2S$-$40P_2S_5$ and 10 wt % of Ketjen black) was cold-pressed onto a side, corresponding to $Li_{3.25}Ge_{0.25}P_{0.75}S_4$, of the two-layer electrolyte obtained in Step 1; a lithium metal plate (99.9%, China Energy Lithium Co., Ltd.) was taken as an anode of the all-solid-state lithium battery, and the anode was cold-pressed onto a side, corresponding to $Li_2B_{12}H_{12}$, of the two-layer electrolyte obtained in Step 1, wherein the cold-pressing was carried out under a pressure of 300 Mpa with the pressure held for 10 min; and Step 3: a material obtained in Step 2 was packaged into a 2032 button cell battery to obtain the all-solid-state lithium battery based on borohydride/sulfide two-layer fast ion conductors.

Figure 4:
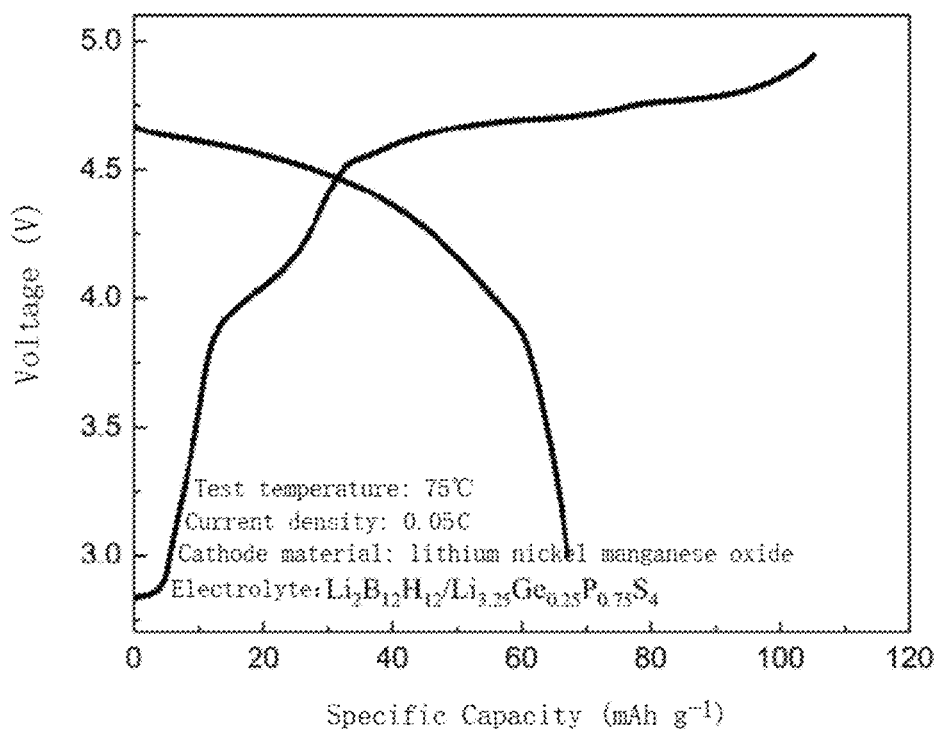
FIG. 4 is a charge-discharge curve of an all-solid-state lithium battery employing lithium nickel manganese oxide as a cathode, $Li_2B_{12}H_{12}$/$Li_{3.25}Ge_{0.25}P_{0.75}S_4$ as an electrolyte and lithium metal as an anode according to Example 3.

The prepared all-solid-state lithium battery was charged and discharged with a constant current of 0.05 C under 75° C., and test results are shown in FIG. 4: from the constant current charge-discharge curve in FIG. 4, it can be seen that the battery with the structure of lithium nickel manganese oxide|$Li_{3.25}Ge_{0.25}P_{0.75}S_4/Li_2B_{12}H_{12}$|Li had a specific discharge capacity at the first cycle of 69 mAh $g^{-1}$, and the test results show that the borohydride and sulfide two-layer fast ion conductor electrolyte is applicable to the lithium nickel manganese oxide cathode system with a voltage up to about 4.7 V.

The invention claimed is:

1. A preparation method of an all-solid-state lithium battery based on borohydride/sulfide two-layer fast ion conductors, comprising the steps of:
   Step 1: cold-pressing a borohydride fast ion conductor and a sulfide fast ion conductor into a two-layer electrolyte;
   Step 2: mixing a cathode active material, a sulfide fast ion conductor, and a conductive agent according to a ratio to prepare a cathode of the all-solid-state lithium battery, and cold-pressing the cathode onto a side, corresponding to the sulfide fast ion conductor, of the two-layer electrolyte obtained in Step 1; and taking a lithium metal plate as an anode of the all-solid-state lithium battery, and cold-pressing the anode onto a side, corresponding to the borohydride fast ion conductor, of the two-layer electrolyte obtained in Step 1; and
   Step 3: packaging a material obtained in Step 2 to obtain the all-solid-state lithium battery based on borohydride/sulfide two-layer fast ion conductors, wherein the sulfide fast ion conductors in Step 1 and Step 2 are any one of lithium sulfide-phosphorus pentasulfide and lithium germanium phosphorus sulfide fast ion conductors.

2. A preparation method of an all-solid-state lithium battery based on borohydride/sulfide two-layer fast ion conductors, comprising the steps of:
   Step 1: cold-pressing a borohydride fast ion conductor and a sulfide fast ion conductor into a two-layer electrolyte;

Step 2: mixing a cathode active material, a sulfide fast ion conductor, and a conductive agent according to a ratio to prepare a cathode of the all-solid-state lithium battery, and cold-pressing the cathode onto a side, corresponding to the sulfide fast ion conductor, of the two-layer electrolyte obtained in Step 1; and taking a lithium metal plate as an anode of the all-solid-state lithium battery, and cold-pressing the anode onto a side, corresponding to the borohydride fast ion conductor, of the two-layer electrolyte obtained in Step 1; and Step 3: packaging a material obtained in Step 2 to obtain the all-solid-state lithium battery based on borohydride/sulfide two-layer fast ion conductors, wherein the cold-pressing in Step 1 and Step 2 is carried out in a pressing mode of equiaxed pressing with a pressure of 100 to 500 MPa and a pressure-holding time of 5 to 20 min.

3. A preparation method of an all-solid-state lithium battery based on borohydride/sulfide two-layer fast ion conductors, comprising the steps of:

Step 1: cold-pressing a borohydride fast ion conductor and a sulfide fast ion conductor into a two-layer electrolyte;

Step 2: mixing a cathode active material, a sulfide fast ion conductor, and a conductive agent according to a ratio to prepare a cathode of the all-solid-state lithium battery, and cold-pressing the cathode onto a side, corresponding to the sulfide fast ion conductor, of the two-layer electrolyte obtained in Step 1; and taking a lithium metal plate as an anode of the all-solid-state lithium battery, and cold-pressing the anode onto a side, corresponding to the borohydride fast ion conductor, of the two-layer electrolyte obtained in Step 1; and Step 3: packaging a material obtained in Step 2 to obtain the all-solid-state lithium battery based on borohydride/sulfide two-layer fast ion conductors, wherein the two-layer electrolyte in Step 1 is plate-shaped with a total thickness of 0.1 to 5 mm, with the borohydride fast ion conductor layer having a thickness of 10-90% of the total thickness and the sulfide fast ion conductor layer having a thickness of 10-90% of the total thickness.

4. A preparation method of an all-solid-state lithium battery based on borohydride/sulfide two-layer fast ion conductors, comprising the steps of:

Step 1: cold-pressing a borohydride fast ion conductor and a sulfide fast ion conductor into a two-layer electrolyte;

Step 2: mixing a cathode active material, a sulfide fast ion conductor, and a conductive agent according to a ratio to prepare a cathode of the all-solid-state lithium battery, and cold-pressing the cathode onto a side, corresponding to the sulfide fast ion conductor, of the two-layer electrolyte obtained in Step 1; and taking a lithium metal plate as an anode of the all-solid-state lithium battery, and cold-pressing the anode onto a side, corresponding to the borohydride fast ion conductor, of the two-layer electrolyte obtained in Step 1; and Step 3: packaging a material obtained in Step 2 to obtain the all-solid-state lithium battery based on borohydride/sulfide two-layer fast ion conductors, wherein the cathode active material in Step 2 is any one of lithium iron phosphate, lithium cobaltate, lithium nickel manganese oxide and lithium nickel manganese cobalt oxide.

\* \* \* \* \*